(12) United States Patent
Bertrand et al.

(10) Patent No.: US 6,520,306 B2
(45) Date of Patent: Feb. 18, 2003

(54) TORSIONAL DAMPING DEVICE, ESPECIALLY FOR CLUTCHES

(75) Inventors: Eric Bertrand, Amiens (FR); Patrick Luczak, Verquin (FR)

(73) Assignee: Valeo, Paris (FR)

( * ) Notice: Subject to any disclaimer, the term of this patent is extended or adjusted under 35 U.S.C. 154(b) by 28 days.

(21) Appl. No.: 09/914,583

(22) PCT Filed: Dec. 15, 2000

(86) PCT No.: PCT/FR00/03566

§ 371 (c)(1),
(2), (4) Date: Oct. 13, 2001

(87) PCT Pub. No.: WO01/50036

PCT Pub. Date: Jul. 12, 2001

(65) Prior Publication Data

US 2002/0166749 A1 Nov. 14, 2002

(30) Foreign Application Priority Data

Dec. 30, 1999 (FR) .............................................. 99 16798

(51) Int. Cl.$^7$ ................................................. F16D 3/18
(52) U.S. Cl. .............................. 192/213.12; 192/213.1; 192/213.2; 192/70.17
(58) Field of Search .......................... 192/70.17, 213.12, 192/213.22, 213.1, 213.2; 464/66, 68

(56) References Cited

U.S. PATENT DOCUMENTS

| 2,613,785 A | | 10/1952 | Mohns | |
| 3,414,101 A | * | 12/1968 | Binder et al. | 192/53.4 |
| 4,606,451 A | * | 8/1986 | Martinez-Corral et al. | 192/213.12 |
| 4,860,871 A | * | 8/1989 | Graton et al. | 192/213.12 |
| 4,890,712 A | * | 1/1990 | Maucher et al. | 192/213.12 |
| 6,050,382 A | * | 4/2000 | Ester et al. | 192/213.1 |

FOREIGN PATENT DOCUMENTS

| FR | 2 536 481 A | 5/1984 |
| GB | 1 452 956 A | 10/1976 |
| GB | 2 322 429 A | 8/1998 |

* cited by examiner

Primary Examiner—Rodney H. Bonck
Assistant Examiner—Eric M. Williams
(74) Attorney, Agent, or Firm—Liniak, Berenato & White

(57) ABSTRACT

A torsion damping device is mounted between two coaxial rotating members for transmitting a rotary toque from one member to the other with damping of vibrations and torque oscillations the damping device comprising, two rings coaxial with the rotating members, rotational coupling means between the two rotating members and the rings, circumferentially acting resilient members mounted between the rings in housing which are formed in the rings and which include a device for abutment of the ends of the resilient members, the two rings are rotatable with respect to each other and with respect to the two rotating members with a limited angular displacement, and are urged in opposite directions of rotation by the resilient members and toward abutment on the device for coupling them to the respective ones of the rotating members.

25 Claims, 9 Drawing Sheets

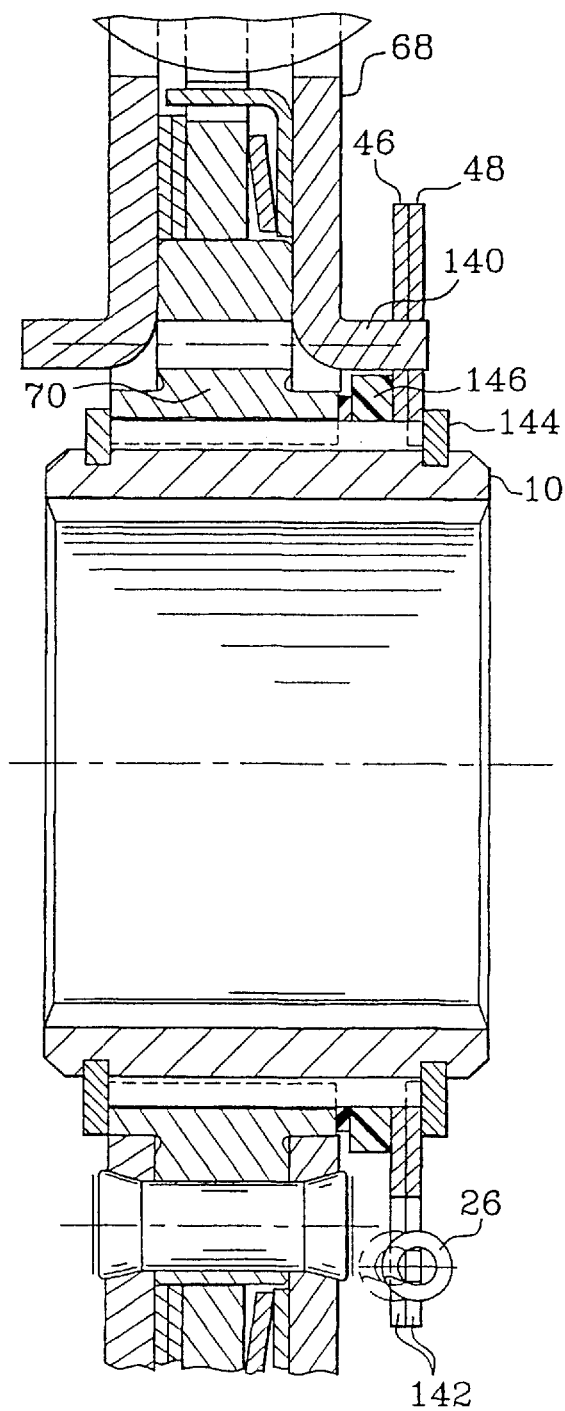
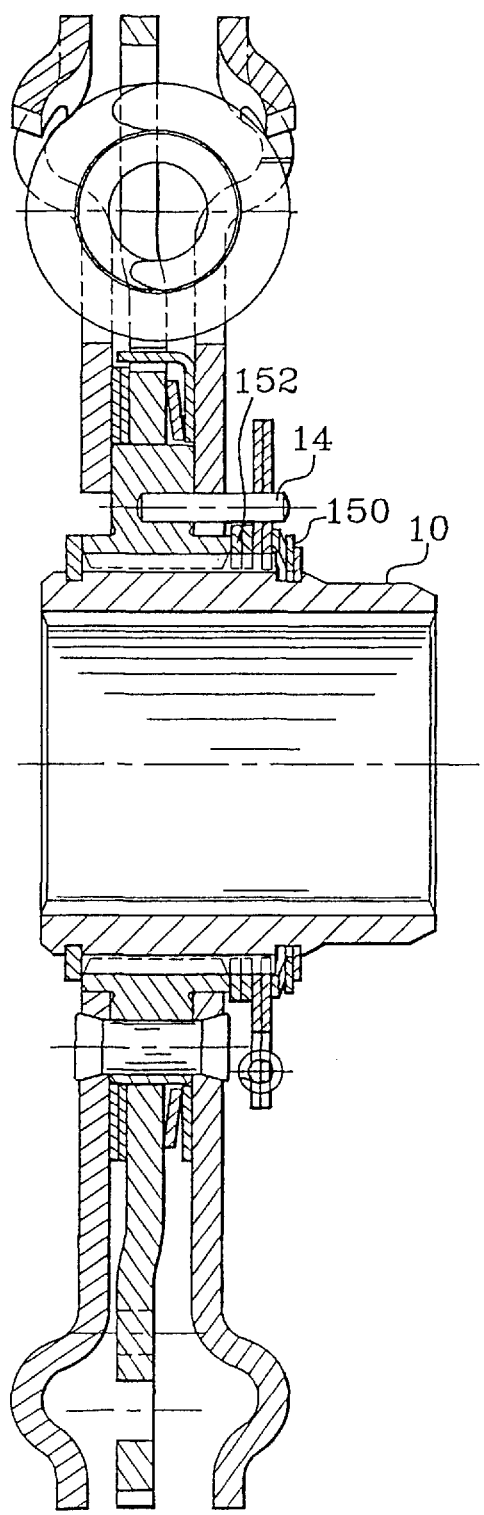
FIG.9
FIG.10

TORSIONAL DAMPING DEVICE, ESPECIALLY FOR CLUTCHES

SUMMARY OF THE INVENTION

This invention relates to a torsion damping device which is mounted between two coaxial rotating members for transmitting a rotational torque between the two said members, with damping out of vibrations and torque oscillations, and it is applicable in particular to friction clutches for motor vehicles.

Conventionally, a torsion damper includes two guide rings which are coaxial with the two rotating members and which are coupled for rotation with each other and with one of the rotating members, an annular damper plate disposed between the two guide rings, and means for coupling the said annular damper plate in rotation to the other rotating member. Circumferentially acting resilient members, such as helical springs, are mounted between corresponding windows of the damper plate and the guide rings, and are in engagement at their ends on the radial edges of the said windows so as to transmit a rotational torque between the guide rings and the annular damper plate, while absorbing vibrations and torque oscillations by elastic deformation.

The axes of the said springs a-re in the plane of the annular damper plate, in such a way that, during angular displacement between the guide rings and annular damper plate, one end of each spring is in axial abutment on a radial edge of a window in the annular damper plate, while its other end is in abutment on the radial edges of the windows in the guide rings, substantially symmetrically with respect to the plane of the annular damper plate, with the resultant of the forces applied at the said other end of a spring being axial with respect to the spring. In such a torsion damper, the springs work in axial compression, which is beneficial to the length of their useful life.

In order to reduce the number of components and the axial size, and also the cost, of such a torsion damper, it has previously been proposed to replace the known structure having two guide rings and an annular damper plate with a simpler structure which only has two rings, one of which is coupled in rotation to one rotating member, the above mentioned springs being disposed between these two rings in housings which are defined by windows or cavities in the said rings. During an angular displacement between the two rings, each spring is in abutment at one end on a radial edge of a window of one ring, and at its other end on a radial edge of a window of the other ring, but these abutments are offset with respect to the axis of the spring, so that the compression forces from the springs are no longer axial but are oriented diagonally, and the compression of the springs is accompanied by bending which tends to displace them with respect to the axis. In order to avoid such displacement, it is necessary to provide means for guiding the springs, which give rise to friction effects liable to disturb the operation of the torsion damper. It is also necessary to over-dimension the springs so that they support the additional stresses caused by their being compressed diagonally.

A main object of the present invention is to overcome these drawbacks in the known art, but without in so doing increasing the number of components, nor the axial size or cost of a torsion damper of the type described above.

To this end, it proposes a torsion damping device, mounted between two coaxial rotating members for transmitting a rotary torque from one member to the other with damping of vibrations and torque oscillations, comprising:

two rings coaxial with the two rotating members,
rotational coupling means between the two rotating members and the rings,
circumferentially acting resilient members mounted between the rings in housings which are formed in the said rings and which include means for abutment of the ends of the resilient members, characterised in that the two rings are rotatable with respect to each other and with respect to the two rotating members with a limited angular displacement, and are urged in rotation by the said resilient members in opposite directions tending to put them into abutment on the means for coupling them to the respective ones of the rotating members.

In the device according to the invention, and by contrast with what is found in the known art, each ring is rotatable with respect to the two rotating members and with respect to the other ring, independently of that other ring. This then enables a first ring to be associated with a first rotating member and the second ring with the second rotating member in one direction of rotation, and conversely, the first ring with the second rotating member and the second ring with the first rotating member in the other direction of rotation, so that it enables the two directions of rotation to be distinguished from each other.

Each ring acts in only one direction on the resilient members, and each resilient member is in constant engagement at one end on an element of one ring, and at its other end on an element of the other ring. This results in improved engagement and improved holding of the resilient members, together with a reduction in wear of the latter and an increase in their useful life.

In addition, because of the constant engagement of the resilient members at each of their ends, it is of advantage to make use of elastomeric blocks as resilient members, in place of the traditional helical springs.

Fitting of the device according to the invention is also more simple than in the known art, because none of the rings has to be coupled in rotation with a rotating member, and this avoids operations of seaming or the like which are used in the known art. Consequently, renovation and maintenance of the clutch are also simplified.

The two rings are preferably identical. According to another feature of the invention, each ring is in engagement on the means for coupling the said ring to one of the rotating members, and a circumferential clearance exists between the said ring and the means for coupling it to the other rotating member.

This, in particular, reduces shocks and damage to the rings and/or their coupling means, in operation.

In a first embodiment of the invention, the two rings are made by press-forming or moulding with the housings of the above mentioned resilient members, each housing having at one of its ends an axial engagement face for an elastic member placed in the said housing.

The opposite end of the housing does not have any axial engagement means for the resilient member.

Preferably, the housings are defined in the said rings by recesses which are situated face to face as between one ring and the other, each recess being joined at one end to a boss which projects towards the other ring so as to define the axial engagement face of a said resilient member.

In a further embodiment of the invention, the said rings are flat and the housings of the resilient members are defined by windows in the rings, with each window having a radial side which serves as an axial abutment for a resilient member and which includes means for centring and retaining that member.

These two rings are simple and inexpensive to make, and can be mounted in engagement on each other.

According to a further feature of the invention, each ring includes a set of teeth meshing, with a predetermined circumferential clearance, with a set of teeth of one of the said rotating members.

The set of teeth of the rings are formed on their inner periphery, and the set of teeth of the said rotating member is formed, for example, on the outer periphery of a cylindrical surface of the said rotating member.

When the rings urged into rotation by the said resilient members in opposite directions are in abutment on the said rotating member, the teeth of one ring are in engagement on the flanks of the teeth of the rotating member and the teeth of the other ring are in engagement on the opposed flanks of the teeth of the said rotating member.

The means for coupling the rings in rotation to the other one of the rotating members comprise, for example, fingers fixed to the said rotating member and engaged in circumferential slots of the said rings, the slots being of limited angular extent.

Preferably, at least one slot of one ring is positioned with respect to a slot of the other ring in such a way that the same finger fixed to the said rotating member passes through the two said slots.

In another version, the means connecting the said rings to one of the rotating members comprise lugs fixed to the rings and engaged between abutments carried by the rotating member, the said lugs being substantially radial.

According to yet another feature of the invention, the torsion damping device constitutes a unitary assembly, the two rings being in hooked engagement on each other by means of circumferential lugs offset axially so as to engage within each other and to oppose axial separation of the rings.

The said unitary assembly can thus be pre-assembled and then fitted on the rotating members.

The device according to the invention can be used for absorption and damping of vibrations and torque oscillations between two rotating members of any type whatsoever.

It can also be used as a main damper and/or as a predamper in a torsion damper of a friction clutch for a motor vehicle.

Where it constitutes a predamper mounted in series with a main damper in a clutch, it can be mounted either inside the main damper or on the outside of the latter, with a very much reduced axial size.

The invention will be better understood, and further features, details and advantages of it will appear more clearly on a reading of the following description, which is given by way of example and with reference to the attached drawings, in which:

BRIEF DESCRIPTION OF THE DRAWINGS

FIGS. 9 and 10 are diagrammatic views in axial cross section of two further modified versions;

DETAILED DESCRIPTION OF THE DRAWINGS

Figure 1:
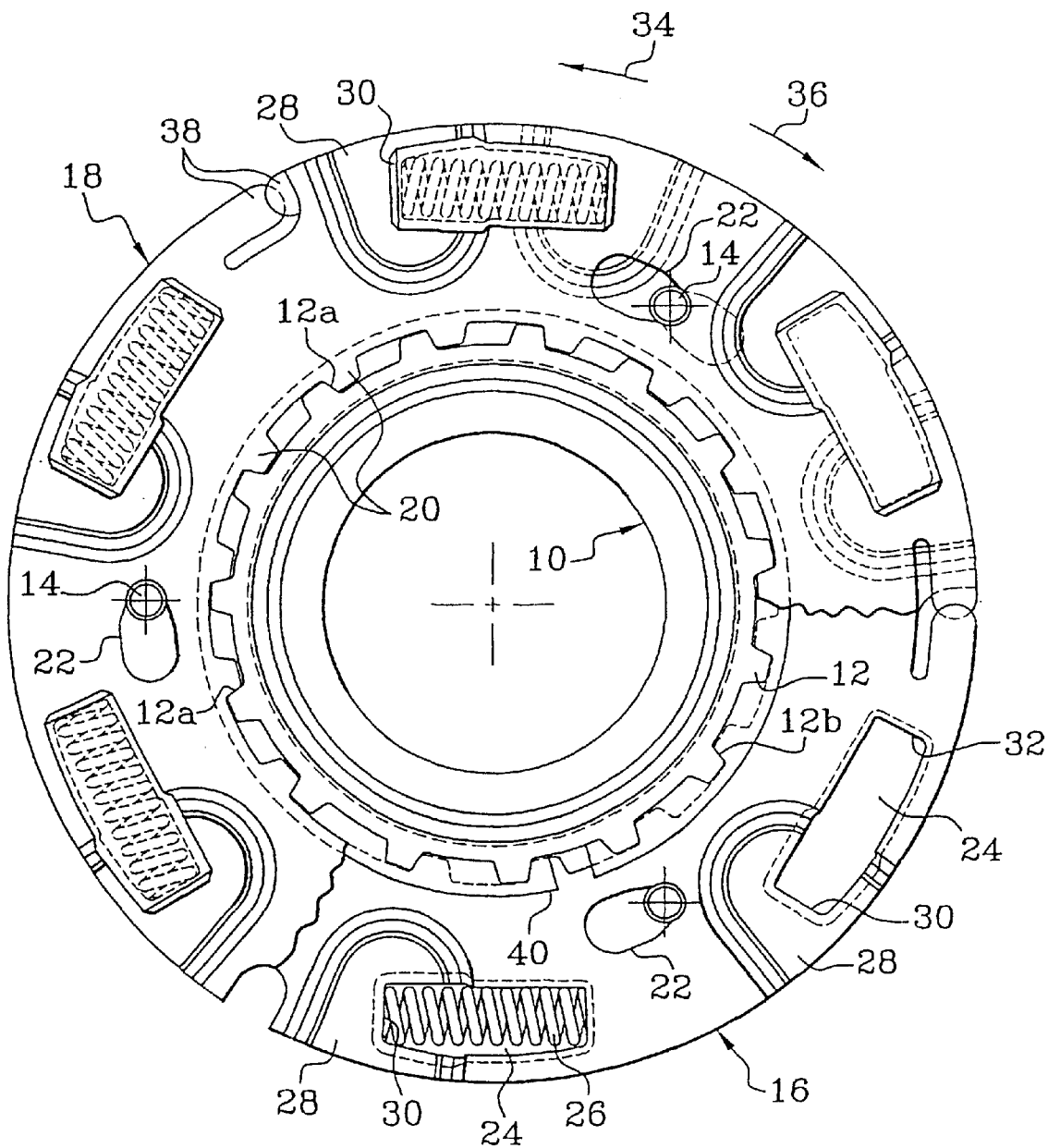
FIG. 1 is a front view of a first embodiment of a device according to the invention.
Figure 2:
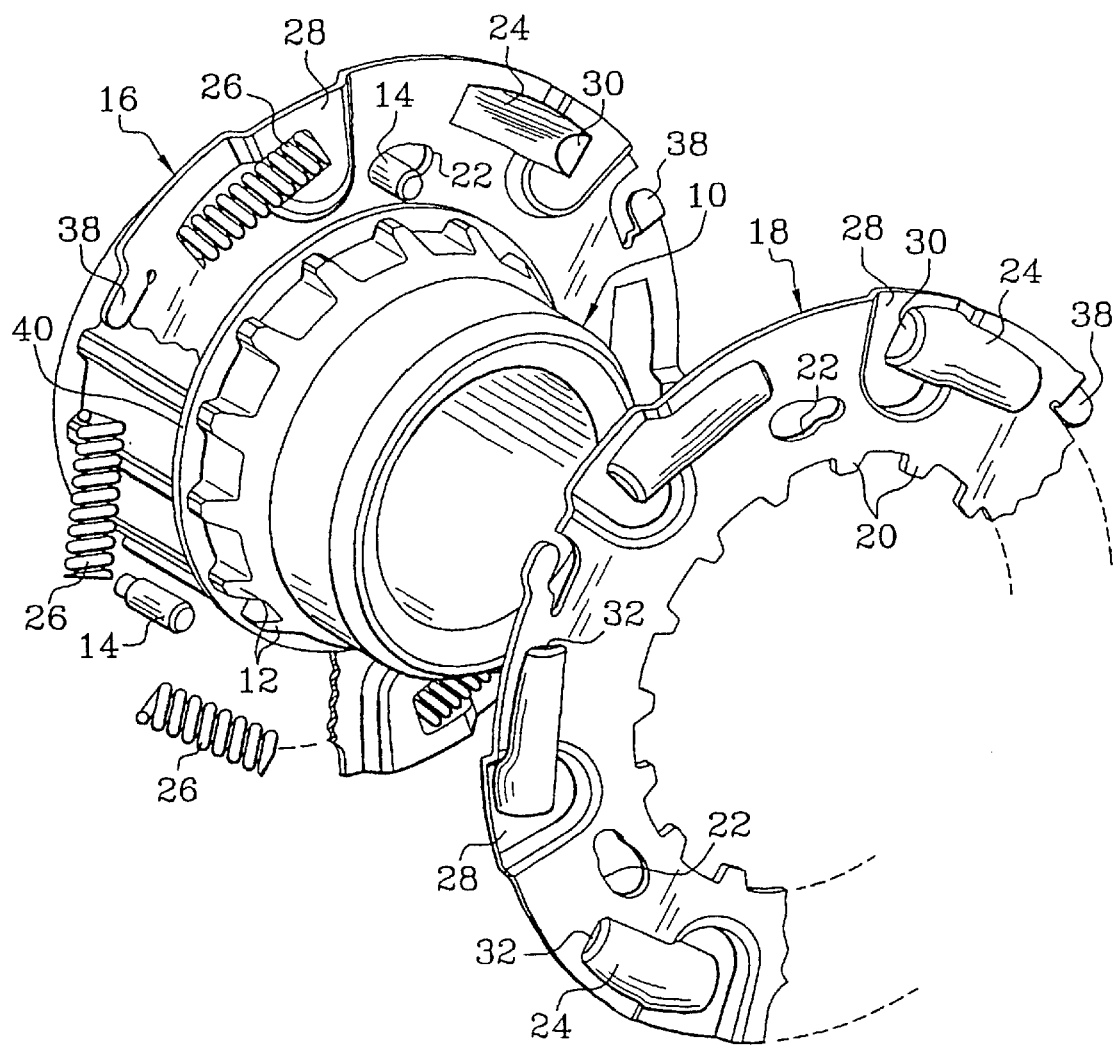
FIG. 2 is an exploded perspective view of the same device shown partly cut away.

Reference is first made to FIGS. 1 and 2, to describe a first embodiment of the device according to the invention. In these Figures, the reference 10 designates a rotating member which is here in the form of a cylindrical hub having an external peripheral set of teeth, the teeth 12 of which extend parallel to the axis over part of the length of the hub 10.

A further rotating member, not shown in FIGS. 1 and 2 and coaxial with the member 10, carries cylindrical fingers 14 which extend parallel to the axis of the member 10, radially on the outside of the said member.

The device according to the invention, the purpose of which is to damp out oscillations and irregularities in the rotary torque between these two rotating members, comprises two identical rings 16, 18 which are mounted face to face on the rotating member 10, and each of which has a set of teeth at its inner periphery, the teeth 20 of which are in mesh with the teeth 12 of the first member 10 with a predetermined circumferential clearance.

In the drawings, the rings 16, 18 have been shown partly cut away to assist understanding, but it has to be understood that each of them is continuous over 360° about the axis of rotation.

The rings 16, 18 have circumferential slots 22 extending over a small angle, the slots 22 of one ring being arranged to be positioned with respect to the slots 22 of the other ring in such a way that the same cylindrical fingers 14 fixed to the other rotating member pass through them.

The rings 16, 18 also include circumferentially oriented, substantially semicylindrical, housings 24 arranged to receive elastically deformable members such as helical springs 26, the length of which corresponds substantially to that of the housings 24. Each housing 24 is open at one end in a boss 28 which projects on the ring towards the opposed ring, and which has a substantially semicircular or U-shaped contour, the opening of which is oriented radially outwards. The semicylindrical housing 24 terminates substantially in the middle of the boss 28, and has an end face 30 which is substantially flat and extends at right angles to the plane of the ring, and which joins the peripheral wall of the housing 24 to the base wall of the boss 28, to define an axial abutment face for one end of the elastic member 26 fitted in that housing 24. The other end 32 of the housing 24 has, at right angles to the plane of the ring, a dimension which is smaller than one half of the transverse dimension of the elastic member 26. Thus, when the rings 16 and 18 are face to face, and when their housings 24 are substantially facing each other, a resilient member, 26 placed between the rings in two mutually facing housings 24 will engage axially at one end on the end face 30 of a housing 24 of one ring, and at its other end on the end face 30 of the housing 24 in the other ring.

The slots 22 in the rings 16, 18 are arranged, with respect to the housing 24 and the cylindrical fingers 14 which are fixed in rotation to the other driving member, in such a way that, when the two rings are mounted on the member 10 in face to face relationship as shown in FIG. 1, with the, resilient members 26 being within the housings 24, the said members 26 urge the two rings into rotation in opposite directions and tend to bring the ends of the slots 22 into abutment on the cylindrical fingers 14, in the direction indicated by the arrow 34 in FIG. 1 for the ring 18, and in the direction indicated by the arrow 36 for the ring 16. In this position, the teeth 20 of the ring 18 are urged against the flanks 12a of the teeth 12 of the first rotating member 10, and the teeth 20 of the other ring 16 are urged on the opposed flanks 12b of these teeth 20. In other words, the ring 16 cannot turn with respect to the two rotating members except in the direction of the arrow 34, and the ring 18 can only turn with respect to these two members in the direction of the arrow 36.

Preferably, in the position of FIG. 1, each ring is in abutment on the means by which it is coupled with one of the rotating members, and a clearance exists between this ring and the means coupling it with the other rotating member.

In operation, when a vibration or torque irregularity results in relative rotation of the first rotating member with respect to the other one in the direction of the arrow 34, the ring 18 is held fast against rotation with respect to the other rotating member due to the fact that the cylindrical fingers 14 fixed to that other rotating member are in engagement on the base of the slots 22 of the ring 18, thus preventing its rotation in the direction of the arrow 34, while the other ring 16 is displaced in rotation in the direction of the arrows 34 with respect to the other rotating member by means of the teeth 12 of the first member 10, which are in engagement, in this direction of rotation, on the teeth 20 of the ring 16. The ring 16 is then turning with respect to the other rotating member until the base of the slots 22 in the ring 16 come into engagement on the cylindrical fingers 14 and/or until the teeth 20 of the ring 16 come into engagement on the flanks 12a of the teeth 12 of the first member 10. This rotation is converted into axial compression of the resilient members 26 in the cavities 24 of the rings 16, 18.

Conversely, when the first member 10 is tending to turn with respect to the other member in the direction indicated by the arrow 36, it drives the ring 18 in rotation with it, the effect of which is to compress the resilient members 26 axially in the direction of the arrow 36, the ring 16 being immobilised against rotation on the other rotating member.

The vibrations and irregularities in torque between the two rotating members are thus absorbed by the axial compression, in either direction, of the resilient members 26 mounted in the cavities 24.

Preferably, the rings turn with respect to the rotating members, until the limit of the angular displacement which is also permitted between the two rotating members is reached, and this avoids, if necessary, any contacts and impacts between the bases of the slots 22 and fingers 14 and/or between the teeth 20 of the ring and the flanks of the teeth 12, and also enables a rotational torque to be transmitted from one rotating member to the other via means which limit their relative angular displacement and not via the rings and the means coupling them in rotation to the rotating members.

Preferably, the rings 16 and 18 include at their outer periphery means for hooking them together, such as circumferential lugs 38 which are axially offset with respect to the rings in such a way that they can engage in each other when the rings are in face to face relationship, thereby preventing the rings from becoming axially separated. The axial position of the assembly of the rings 16, 18 on the first rotating member 10 is defined for example by means of an open elastic ring 40, or circlip, which is engaged in an annular groove formed in the outer peripheral set of teeth of the first rotating member 10. The rings 16, 18 are on either side of this open ring 40, and are held by the latter in an axial position on the first rotating member 10.

In the embodiment shown in FIGS. 1 and 2, the rings 16, 18 are of metal and are in the form of pressings or stampings. In another version they may be made by moulding in any appropriate material, for example in a fibre reinforced plastics material.

This device has a certain number of advantages as compared with the known art: the rings are identical, the number of components is reduced, axial size is small, the resilient members are in permanent axial engagement at their ends and are able to be compressed under good conditions, while assembly and fitting are simplified and assembly cost is reduced.

In one modified version, the resilient members are blocks of elastomer, which behave well in compression due to the fact that their ends are in constant abutment on the ends 30 of the housings 24.

Figure 3:
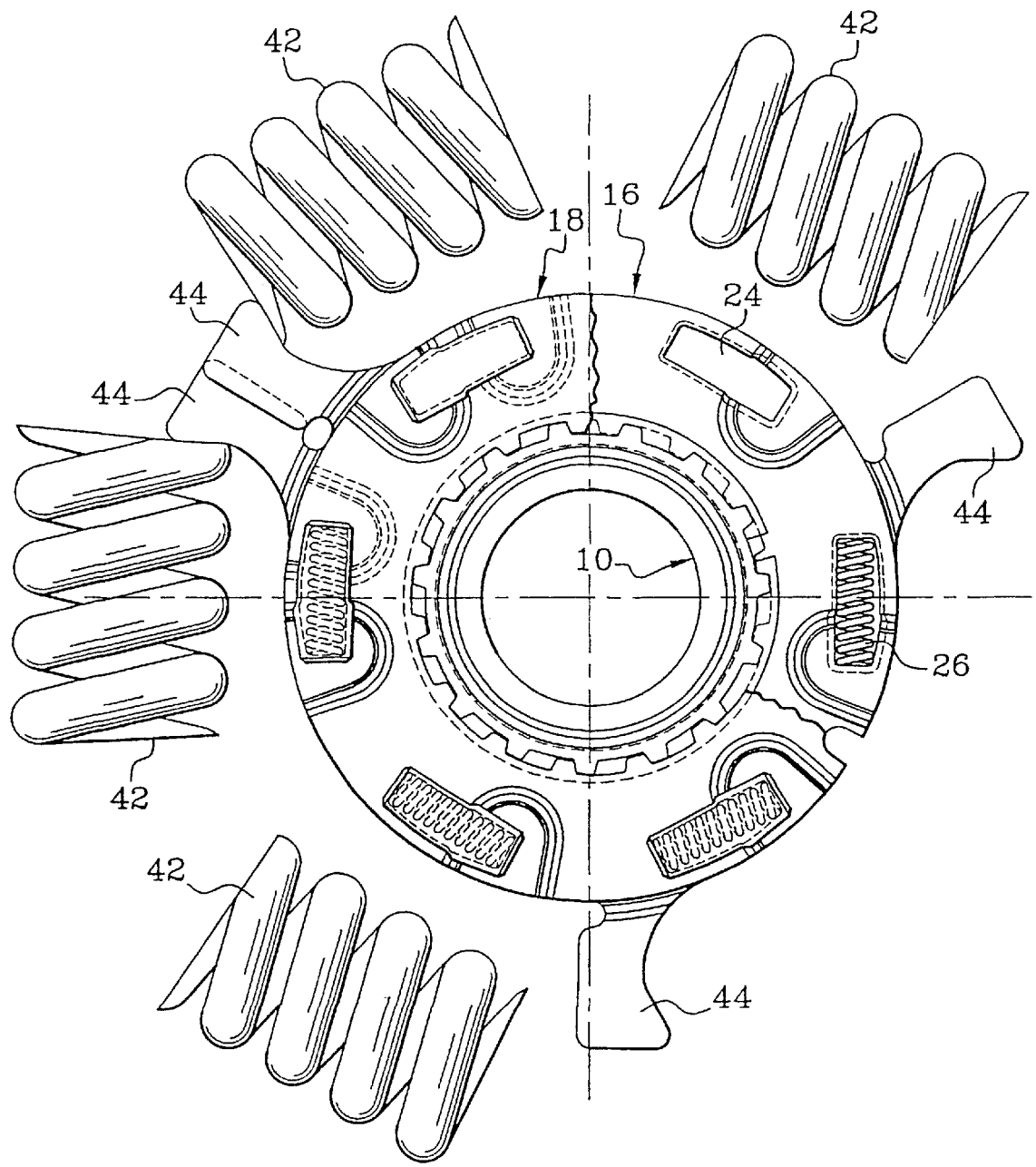
FIG. 3 is a diagrammatic partial front view of a modified version of the device according to the invention.

In the modified version shown diagrammatically in FIG. 3, the device according to the invention is a predamper which is mounted in a friction clutch for a motor vehicle, in series with a main damper which includes resiliently deformable members 42 acting circumferentially, the dimensions and stiffness of which are in particular greater than those of the resilient members 26 of the predamper, and which are mounted in windows of an annular damper plate and of two guide rings (not shown), in a well known way, and which will be described with reference to FIGS. 7 to 10.

In this version, the means for coupling the rings 16 and 18 of the predamper in rotation to the said other rotating member (the annular damper plate or one of the guide rings of the main damper) no longer consist of cylindrical fingers 14 engaged in circumferential slots 22 in the rings, but consist instead of radial fingers 44 of the rings 16, 18 which are in abutting cooperation with the ends of the resilient members 42 of the main damper.

For the rest, the structure of the device according to the invention is identical to that described with reference to FIGS. 1 and 2.

In operation, rotation of each ring 16, 18 with respect to the rotating member 10 is limited by the circumferential clearance between the sets of teeth 12 and 20 of the member 10 and of the rings 16, 18, the lugs 44 serving to prevent rotation of the ring 16 in the clockwise direction in FIG. 3, and rotation of the ring 18 in the opposite direction, and to limit these rotations in the two opposed directions by angular displacement between the ends of the resilient members 42.

In the example shown, the lugs 44 of the rings extend radially outwards substantially in the plane of the rings, but could extend in different directions if necessary, for abutting cooperation with the ends of the resilient members 42 of the main damper.

These lugs 44, which are in overlapping pairs as shown in FIG. 3, also maintain the rings 16 and 18 hooked together and prevent them from separating axially.

Figure 4:
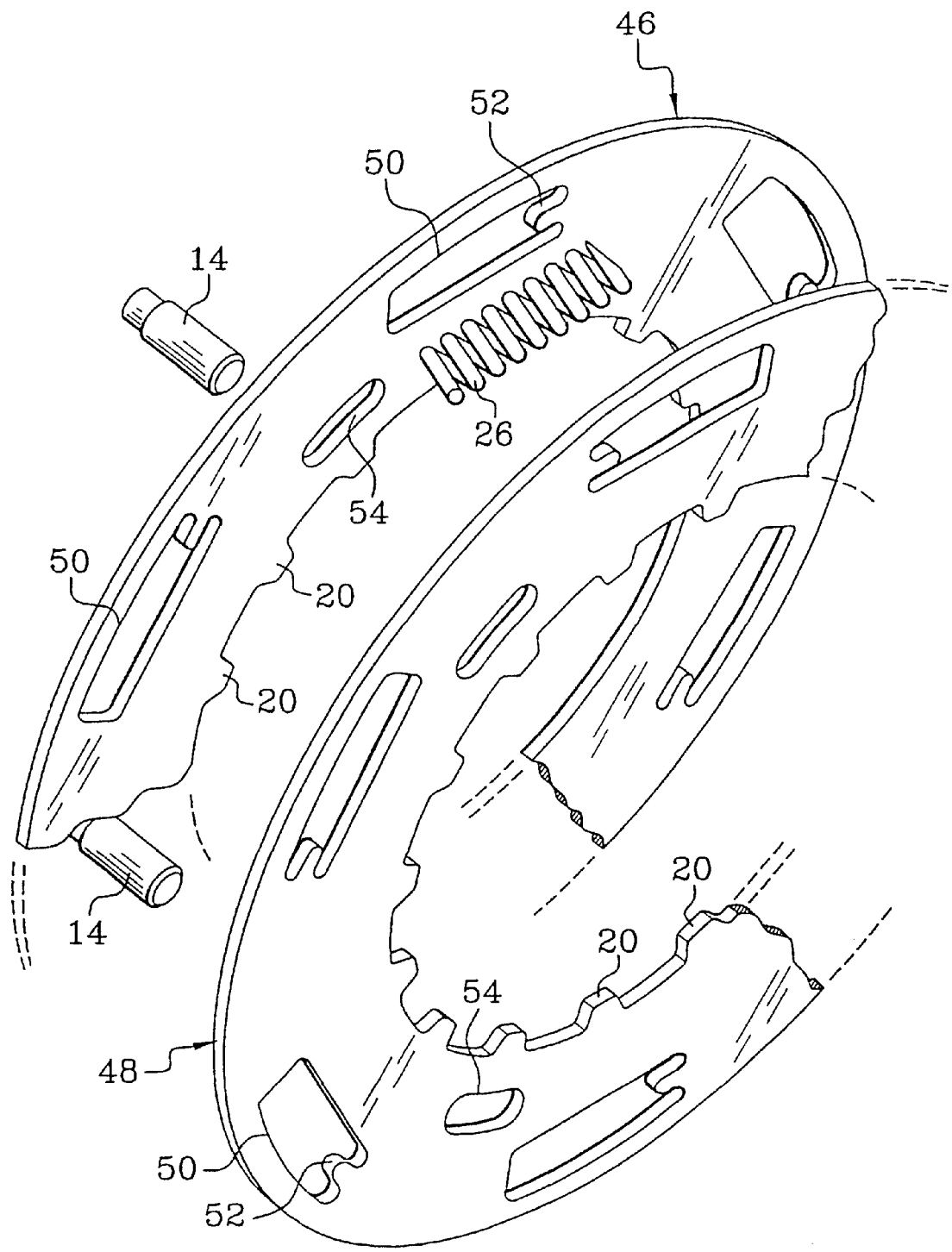
FIG. 4 is an exploded perspective view, partly cut away, of a further modified version of the device.
Figure 6:
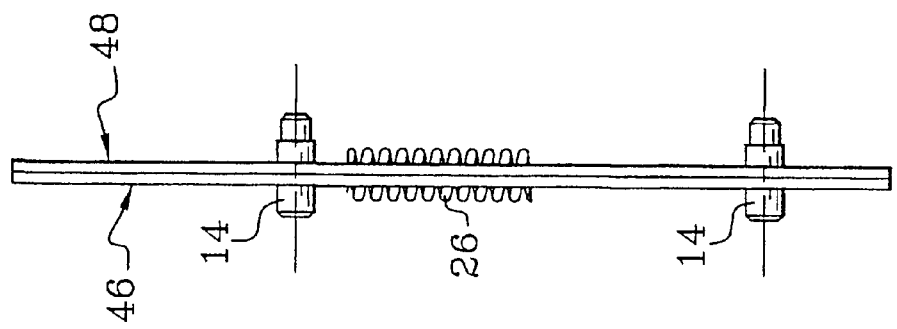
FIG. 6 is a side view of the device shown in FIG. 5.
Figure 5:
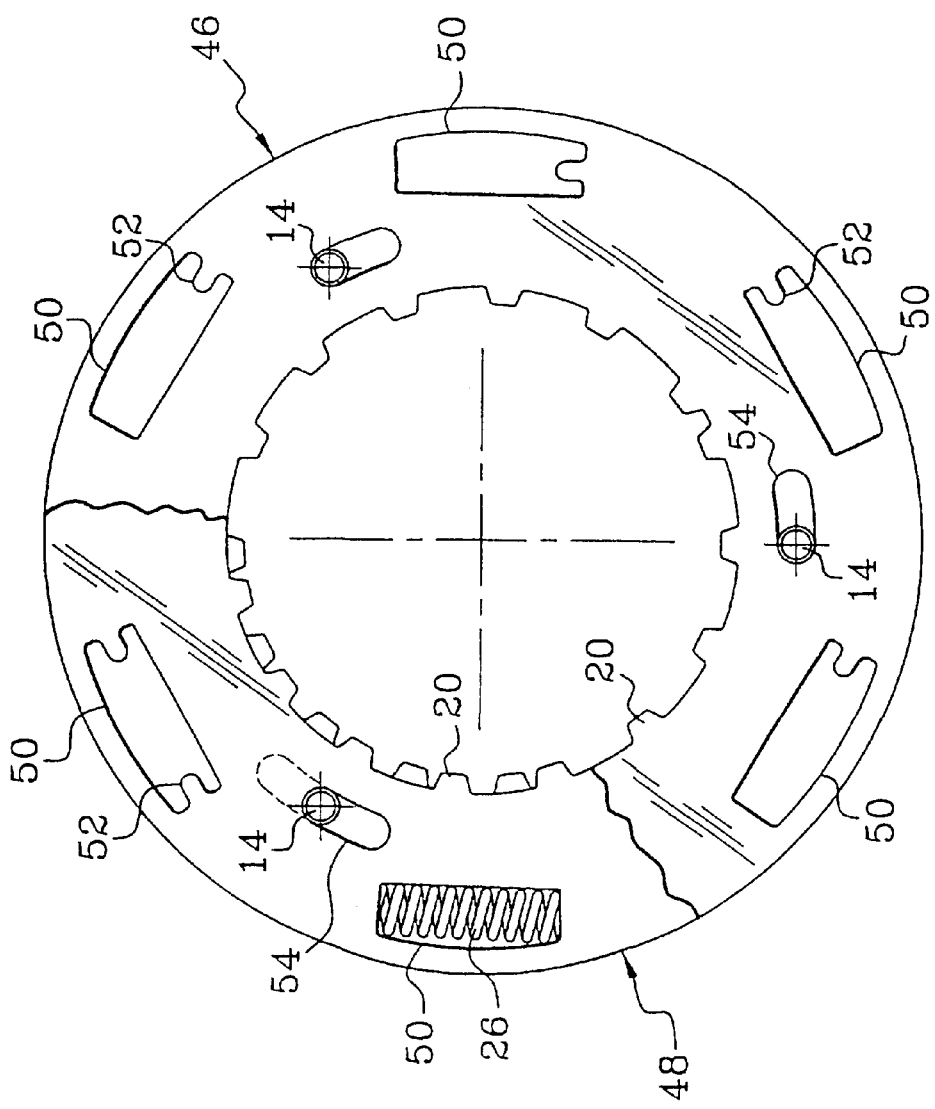
FIG. 5 is a front view of the device in FIG. 4.

In the modified version shown diagrammatically in FIGS. 4, 5 and 6, the two rings 46, 48 of the device according to the invention are flat, and the housings for the resilient members 26 are circumferential windows 50 of substantially rectangular form, of substantially the same length as the resilient members 26 in the rest condition.

In order to ensure centring and retention of the resilient members 26 in the windows 50, one radial edge of each window includes a nose 52 or the like which is engaged in one end of the corresponding resilient member 26.

For the rest, the structure of the device is similar to that described with reference to FIGS. 1 and 2: the two rings 46 and 48 are coupled in rotation to a first rotating member 10 by means of an internal set of teeth 20, and to the other rotating member by means of cylindrical fingers 14 fixed to the said other rotating member and engaged in circumferential slots 54 in the rings. In addition, the rings 46 and 48 are applied one on the other.

FIGS. 7 to 11 show diagrammatically various ways of incorporating a device according to the invention in a torsion damper for a friction clutch for a motor vehicle.

Figure 7:
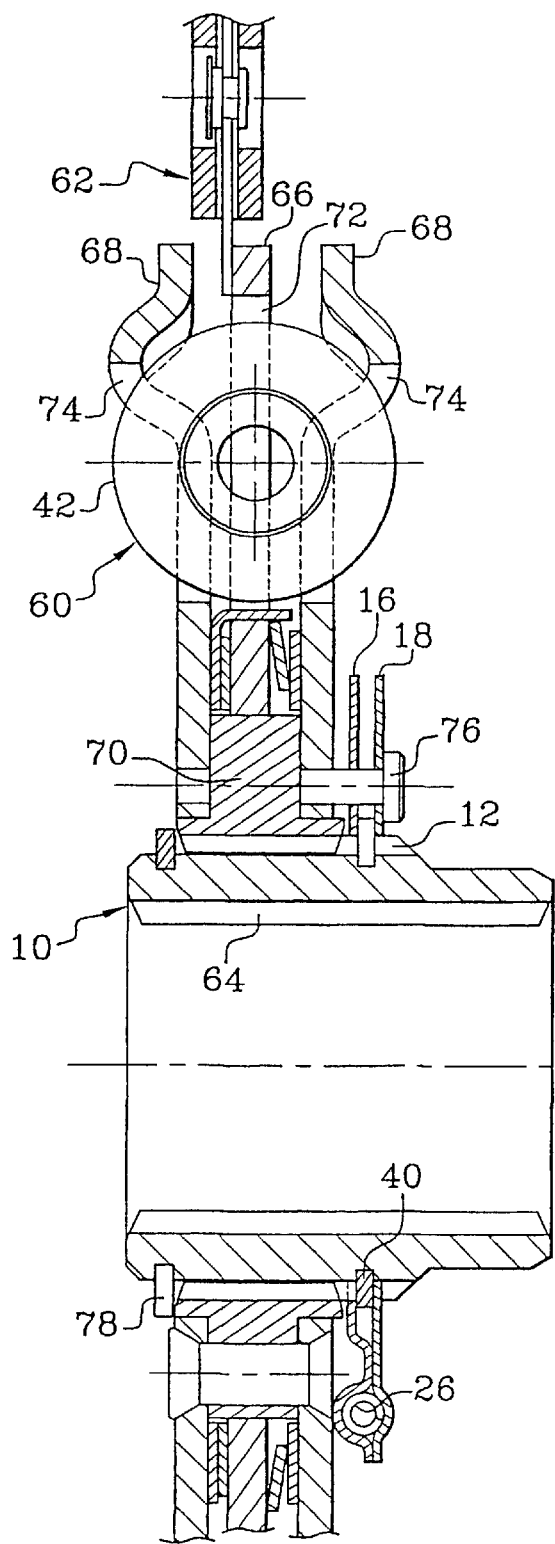
FIG. 7 is a partial view, in axial cross section, of a torsion damper for a clutch, including a device according to the invention.
Figure 8:
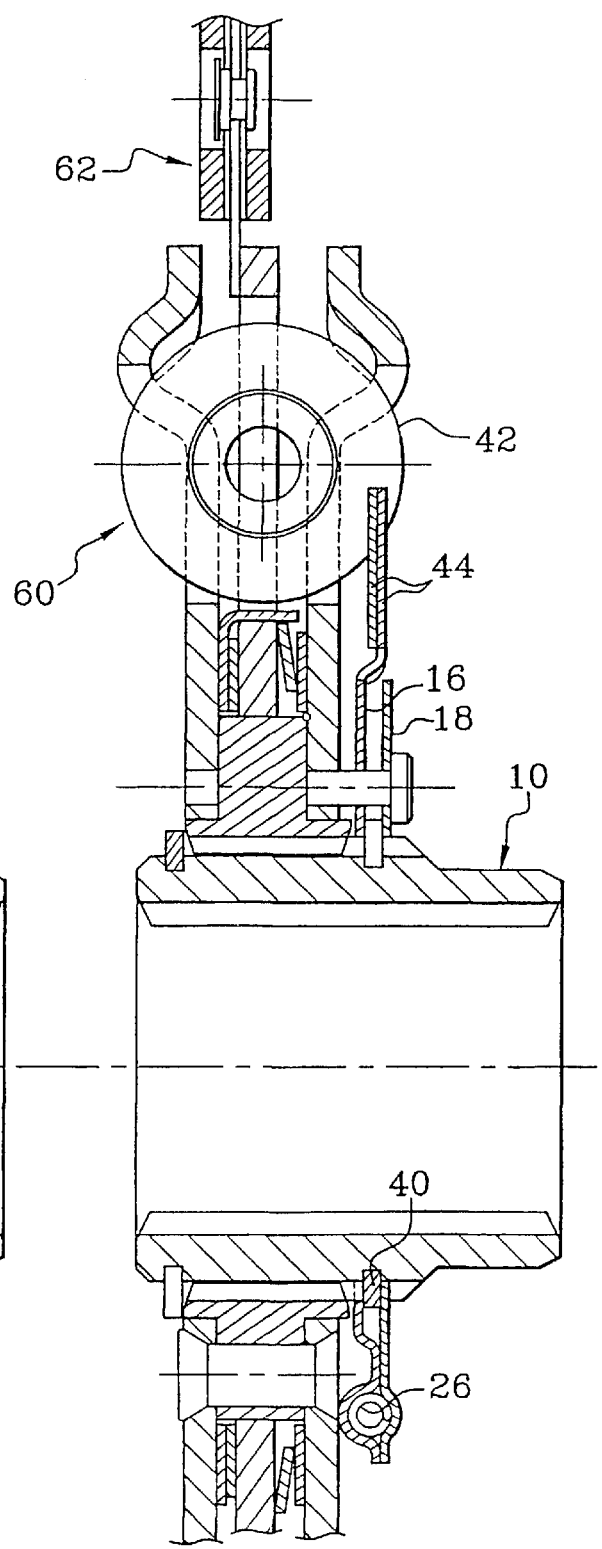
FIG. 8 is a diagrammatic partial view in axial cross section of the damper of FIG. 7, equipped with the version which is shown in FIG. 3.

In FIGS. 7 and 8, the torsion damper comprises a main damper 60 which is mounted in series with a predamper consisting of a device according to the invention, between an input element 62 consisting of a friction disc and an output element consisting of the above mentioned rotating member 10, which constitutes a cylindrical hub the inner surface of which has longitudinal splines 64 for coupling the member 10 in rotation with an output shaft such as the input shaft of a gearbox. The main damper comprises an annular damper plate 66 which carries a friction disc 62 and is mounted between two identical guide rings 68 which are centred and fixed on a sleeve 70 that has a set of internal teeth meshing, with a predetermined circumferential clearance, with the external set of teeth 12 of the member 10, and optionally an external set of teeth meshing, with a predetermined circumferential clearance, with an internal set of teeth of the annular damper plate 66.

The above mentioned resilient members 42 of the main damper are lodged in windows 72 and 74 formed respectively in the annular damper plate 66 and the guide rings 68, while friction rings, biased axially by means of resilient rings, are mounted between the annular damper plate 66 and at least one of the guide rings 68, for the purpose of damping out oscillations and torque irregularities absorbed by the resilient members 42 of the main damper.

The predamper consists of the device shown in FIGS. 1 and 2 and is mounted outside the main damper 60 on the set of external teeth 12 of the member 10. The circumferential clearance between the teeth of the rings 16, 18 and the teeth 12 of the member 10 is for example greater than or substantially equal to the clearance between the teeth of the sleeve 70 and the member 10. The cylindrical fingers 14 which couple the rings 16 and 18 in rotation to the main damper are, in this example, screws or rivets 76, extending through the slots 22 in the rings 16 and 18 and mounted in appropriate apertures in one guide ring 68.

On the side of the predamper that consists of the device according to the invention, the axial ends of the teeth 12 of the member 10 are chamfered, which enables the device according to the invention to be mounted on the member 10 by pushing it axially on to the latter, the open elastic ring 40 expanding radially while passing over the chamfered end of the teeth 12, and closing up again radially when it reaches the level of the annular groove formed in the set of teeth 12 for receiving it.

The predamper consisting of the device according to the invention is in axial abutment on the main damper, which is itself held in axial position on the member 10 by means of a further open ring 78 on the opposite side from the predamper.

In the version shown in FIG. 8, the main damper is the same as in FIG. 7, but the predamper is the one shown in FIG. 3. In this case, the radial lugs 44 of the rings 16 and 18 of the predamper are in abutment on the ends of the resilient members 42, and couple the main damper in rotation with the rings 16, 18.

In the version in FIG. 9, the predamper is of the same type as that shown in FIGS. 4 to 6, and the driving fingers 14 are replaced by lugs 140 of the guide ring 68 of the main damper, these lugs 140 being formed on the inner periphery of the ring 68 and bent back at right angles parallel to the axis of rotation so as to penetrate into circumferential slots in the rings 46, 48 of the predamper.

In addition, the resilient members 26 of the predamper are lodged, no longer in windows in the rings 46, 48, but in notches 142 in the outer periphery of these rings, so as to reduce the radial size of the predamper.

The latter is located axially on the hub 10 between an open ring 144 mounted in an annular groove of the hub., and friction means 146 which are biased axially on the sleeve 70 of the main damper.

In another version, the lugs 140 may be replaced by pins welded on the guide ring 68.

In a further version, the lugs 140 are replaced by a deformation of the ring 68, which is obtained by a stamping operation and which is engaged axially in slots or between radial fingers of the rings 46, 48 of the predamper.

In the modified, version shown in FIG. 10, the predamper is similar to that shown in FIG. 9, and it is retained axially on the hub 10, not by an open ring but by a wound elastic ring 150 which is at least partly fitted in an annular groove of the hub 10. This ring has a plurality of turns, the radius of which is either variable or not variable, and is formed with undulations enabling an axial force to be applied to the predamper, in order to grip the friction rings 152 on one end of the sleeve 70 of the main damper. The predamper is coupled in rotation to this sleeve 70 by means of fingers 14 similar to those described above.

In this embodiment, the ring 150 replaces one open ring and one resilient ring, which reduces the number of components and makes assembly easier.

Figures 11, 12:
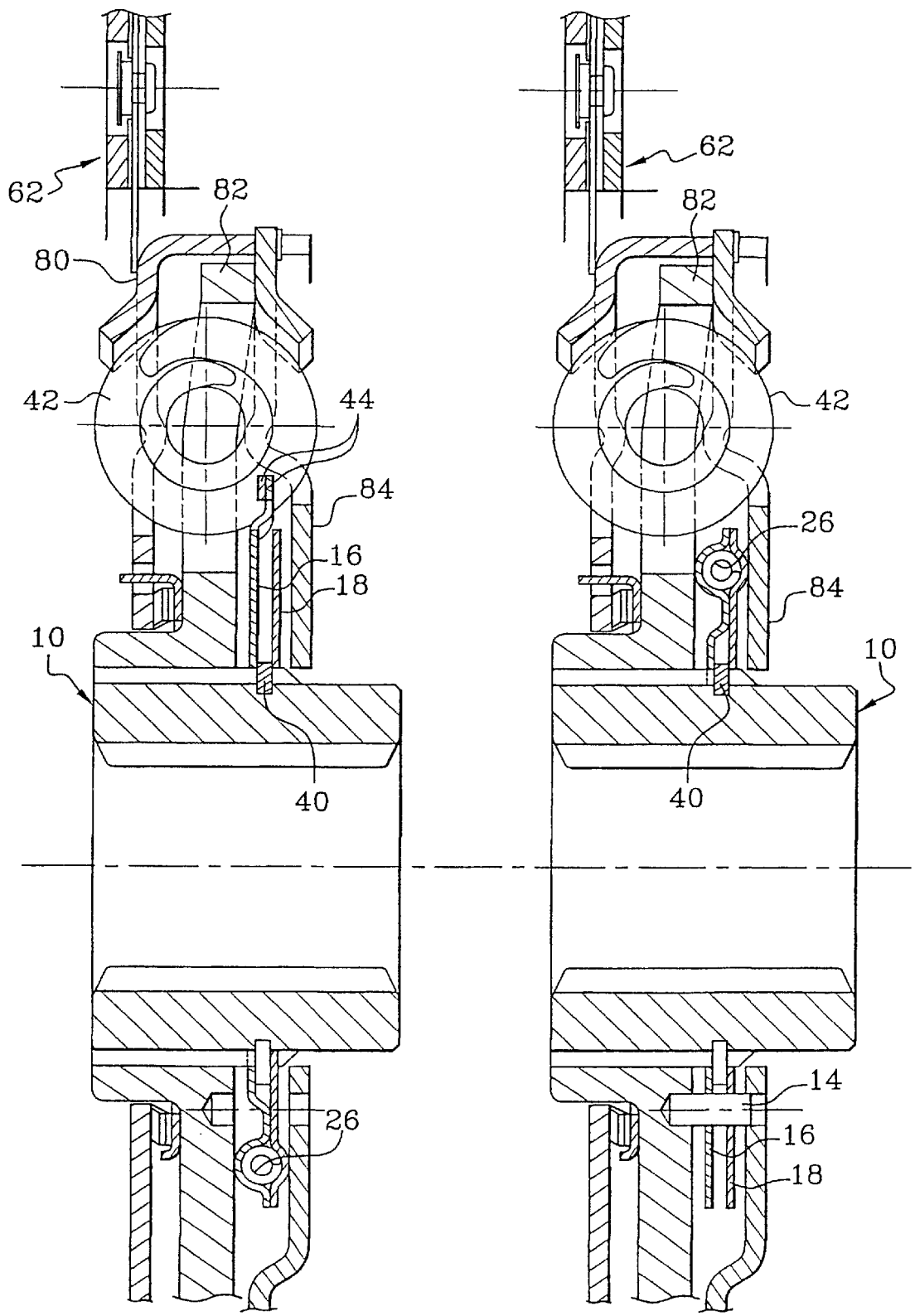
FIG. 11 is a diagrammatic partial view in axial cross section of the version in FIG. 3, mounted in a torsion damper of another type.
FIG. 12 is a diagrammatic partial view in axial cross section of the damper in FIG. 11, equipped with the device shown in FIGS. 1 and 2.

In the embodiments in FIGS. 11 and 12, the main damper is of a different type from those in FIGS. 7 and 8, and the predamper is mounted on the member 10 within the main damper.

In this version, the friction disc 62 is carried by a guide ring 80 of the main damper, and the predamper is disposed between the annular damper plate 82 and the other guide ring 84 of the main damper.

In FIG. 11, the predamper is of the type shown in FIG. 3, and its rings 16, 18 are coupled in rotation to the main damper by means of radial lugs 44 which come into abutment on the ends of the resilient members 42 of the main damper.

In FIG. 12, the predamper is of the type shown in FIGS. 1 and 2, and its guide rings 16 and 18 are coupled in rotation to the annular damper plate 82 of the main damper by means of cylindrical fingers 14 engaged in slots 22 in the rings 16, 18, and in appropriate holes formed in the annular damper plate 82 and in the guide ring 84 of the main damper.

For the rest, fitting of the predamper on the member 10 is carried out in the manner described above with reference to FIGS. 7 and 8.

Axial location of the predamper on the hub 10 can be obtained by means of the ring 40 as shown in particular in FIGS. 7 and 8, or in any other appropriate way, between the rings 16, 18 or on the outside of these latter, for example by means of a "flip-flop" ring (everting ring), or a bayonet fitting, and so on.

Friction means (in general a friction ring biased axially by a resilient ring) are associated with the rings 16, 18 for damping out the vibrations, and are for example between the rings 16, 18 or on the outside of these latter. In this last case, resilient rings of different thicknesses may be used so as to give different degrees of hysteresis in both directions of rotation.

Figure 13:
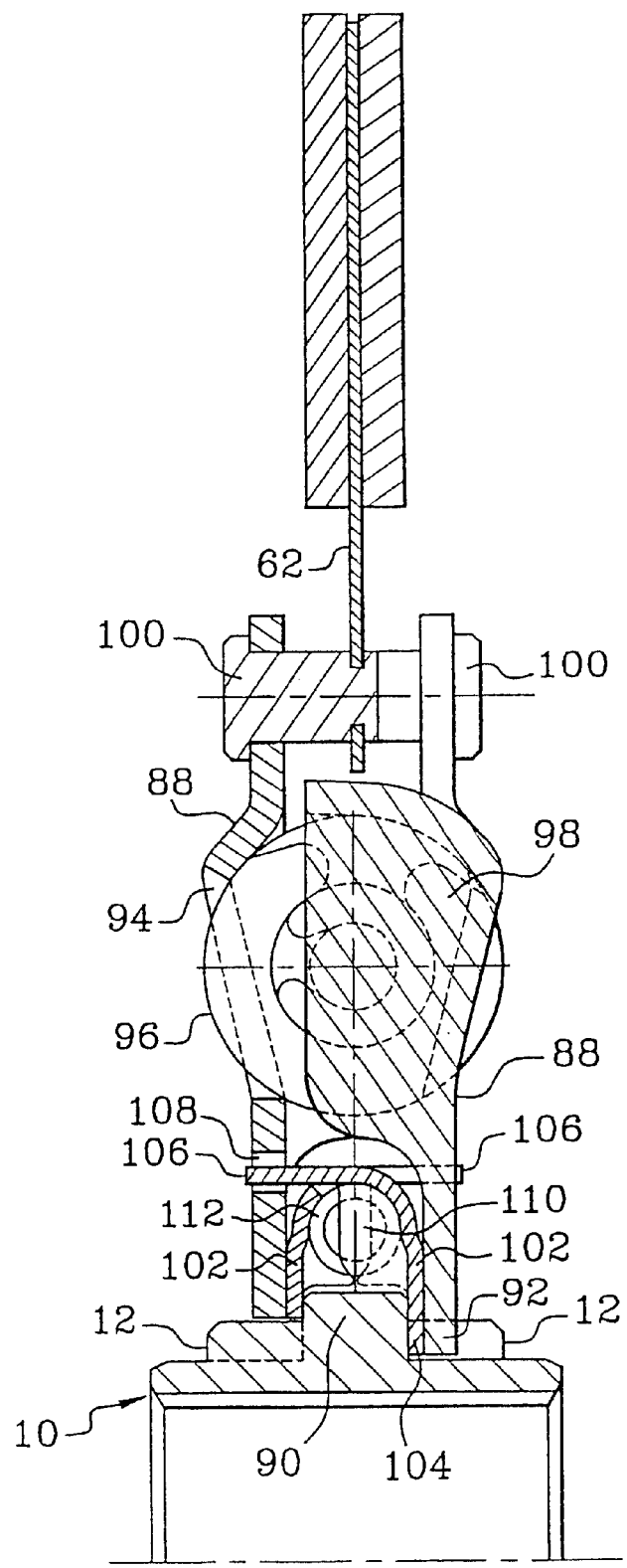
FIG. 13 is a half view in axial cross section of a modified version.

In the embodiment in FIG. 13, a device according to the invention constitutes the main damper of the torsion damper mounted between the friction disc 62 and the hub 10, and comprises two rings 88 which are preferably identical, and which are mounted face to face on the hub 10 on either side of an open ring or a median peripheral flange 90 of the hub. Each ring 88 has an internal set of teeth 92 meshing with a predetermined circumferential clearance with an external set of teeth 12 of the hub 10, and also has windows 94 for mounting circumferentially acting resilient members 96 for absorbing vibrations and torque irregularities, each window 94 including at one end a flange 98 for axial abutment of one end of the resilient member 96, its other end having none, and axial lugs or rivets 100 are for example fixed at the outer periphery of the friction disc 62 and guided in circumferential slots of the ring 88, or vice versa. As previously described for the foregoing embodiments, the rings 88 are biased by resilient members 96 in opposite directions, so tending to bring the rivets 100 into engagement on the ends of the above mentioned slots and the sets of teeth 92 into engagement on the sets of teeth 12 of the hub. The operation of this main damper is identical to the operation already described of the torsion damper in FIGS. 1 and 2.

The predamper in the embodiment in FIG. 13 may be of a conventional type or may be a device according to the invention. In the latter case, the predamper has two identical rings 102 mounted face to face on the hub 10 on either side of the peripheral flange 90, and each between the flange 90 and a ring 88 of the main damper.

Each ring 102 includes an internal set of teeth 104 which is in engagement, with a predetermined circumferential clearance, with a set of teeth 12 of the hub, and includes lugs 106 parallel to the axis which are received in circumferential slots 108 of the ring 88 adjacent to the other ring 102 of the predamper, so that the lugs 106 of the two rings interleave with each other at the outer periphery of these rings.

Plate elements 110, projecting from the rings 102 and lugs 106, constitute axial abutments for the ends of the circumferentially acting resilient members 112 of the predamper, each resilient member 112 being in axial engagement at one end on one plate element 110 of a ring 102 and at the other end on a plate element 110 of the other ring 102.

The outer peripheries of the rings 102 are curved towards each other as shown, so as to define semicylindrical housings for the resilient members 112 around the peripheral flange 90 of the hub 10.

Operation of this predamper corresponds to that of the device in FIGS. 1 and 2, the main damper behaving like a rigid member in response to vibrations and torque irregularities in the slow running mode, which are designed to be absorbed by the predamper.

At low rotational torques transmitted from the friction disc 62 to the hub 10, corresponding in particular to the slow running mode of an internal combustion engine of a motor vehicle (the gearbox being in neutral), the disc 62 drives in rotation one of the rings 88, for example the one on the left in FIG. 13, by engagement on the rivets 100 which connect the disc to that ring. The torque is transmitted to the other ring 88 through the resilient members 96, which behave like rigid members because of their high stiffness. The rigid assembly formed by the rings 88 and resilient members 96 has a slight angular clearance with respect to the hub 10, corresponding to the angular displacement of the predamper. The main damper therefore transmits the torque to the rings 102 of the predamper, for example from the ring 88 on the right in the drawing to the left hand ring 102, which transmits it to the other ring 102 of the predamper through the resilient members 112 which absorb the vibrations. Since the right hand ring 102 is in abutment on the hub 90 through the teeth 104, 12, the torque is transmitted to the hub 10.

An increase in the torque in the same direction of rotation results in compression of the resilient members 112 of the predamper and rotation of the main damper until the right hand ring 88 is in abutment on the hub 10 through the teeth 92, 12.

Subsequently, when the transmitted torque increases even more in the same direction, there is progressive compression of the resilient members 96 of the main damper, the left hand ring 88 turning with respect to the right hand ring 88 which is in abutment on the hub 10.

Preferably, the rings 88 may be biased axially on the rings 102, which may themselves be biased axially on the median flange 90 of the hub, so that vibrations and torque irregularities absorbed by the resilient members 112 of the predamper and 96 of the main damper are absorbed. Any way known to the person in this technical field, comprising resilient rings, whether or not they are used in combination with friction rings, may be associated with the rings 88 and 102 and with the peripheral flange 90 in order to obtain the desired friction forces. Similarly, the surfaces of the rings 88 and 102 and flange 90 in contact with each other may be determined to that effect.

What is claimed is:

1. A torsion damping device, mounted between two coaxial rotating members for transmitting a rotary torque from one member to the other with damping of vibrations and torque oscillations, comprising:

two rings (16, 18, 46, 48) coaxial with the two rotating members, rotational coupling means between the two rotating members and the rings, and circumferentially acting resilient members (26) mounted between the rings in housings (24, 50) which are formed in the rings and which include means for abutment of the ends of the said resilient members, characterised in that the two rings (16, 18, 46, 48) are rotatable with respect to each other and with respect to the two rotating members (10, 68, 82) with a limited angular displacement, and are the rings urged in opposite directions of rotation by the resilient members (26) toward abutment on the means for coupling them to the respective ones of the rotating members.

2. A device according to claim 1, characterised in that the two rings (16, 18, 46, 48) are biased axially into abutment on the means (44, 140, 22, 12, 20) for coupling them in rotation to the two rotating members.

3. A device according to claim 1, characterised in that each ring is biased into engagement on the means for coupling it to one of the rotating members, and a circumferential clearance exists between the said ring and the means for coupling it to the other rotating member.

4. A device according to claim 1, characterised in that each ring (16, 18, 48) includes a set of teeth (20) meshing, with a predetermined circumferential clearance, with a set of teeth (12) of one of the rotating members.

5. A device according to claim 4, characterised in that the set of teeth (20) of the rings are formed on their inner periphery, and the set of teeth (12) of the rotating member (10) is formed on the outer periphery of a cylindrical surface of the said member.

6. A device according to claim 4, characterised in that the resilient members (26) bias the teeth (20) of one ring into engagement on flanks (12a) of the teeth (12) of the rotating member and the teeth (20) of the other ring into engagement on the opposed flanks (12b) of the teeth (12) of the rotating member.

7. A device according to claim 1, characterised in that the means for coupling the said rings (16, 18, 46, 48) in rotation to one of the rotating members comprise fingers or lugs (14, 140) fixed to the said rotating member and engaged in circumferential slots (22, 54) of the said rings, the slots being of limited angular extent.

8. A device according to claim 7, characterised in that the said fingers or lugs (14, 140) are substantially parallel to the axis of rotation.

9. A device according to claim 5 characterised in that at least one said slot (22, 54) of one ring is positioned with respect to a slot (22, 54) of the other ring in such a way that the same finger or the same lug (14, 140) fixed to the rotating member passes through the two said slots.

10. A device according to claim 1, characterised in that the means connecting the said rings (16, 18) to one of the rotating members comprise lugs (44) fixed to the rings and engaged between abutments carried by the rotating member.

11. A device according to claim 10, characterised in that the said lugs (44) are substantially radial.

12. A device according to claim 1, characterised in that the two rotating members include sets of teeth meshing with each other with a predetermined circumferential clearance which is less than or substantially equal to the circumferential clearance of the rings (16, 18) with respect to the two rotating members.

13. A device according to claim 1, characterised in that the two rings (16, 18) are identical.

14. A device according to claim 1, characterised in that the two rings (16, 18) are formed by press-forming or stamping or by moulding with housings (24) for the said resilient members (26), each housing (24) including at one of its ends a face (30) for axial abutment of the resilient member (26) placed in the said housing.

15. A device according to claim 13, characterised in that the other end (32) of the said housing is without any means for axial abutment of the said resilient member (26).

16. A device according to claim 1, characterised in that the said housings (24) are defined in the said rings (16, 18) by recesses situated face to face as between one ring and the other, each recess being joined through one end to a boss (28) projecting towards the other ring so as to define the means (30) for axial abutment of a resilient member (26).

17. A device according to claim 1, characterised in that the resilient members are blocks of elastomer.

18. A device according to claim 1, characterised in that the said rings (46, 48) are flat, and in that the housings for the resilient members (26) are defined by recesses or windows (50) in the rings, each recess or window having a radial side which serves as an axial abutment for a resilient member (26) and which includes means (52) for centring and retaining the said member.

19. A device according to claim 18, characterised in that the opposite radial side of the recess or window (50) is without any centring or retaining means for the resilient member (26).

20. A device according to claim 18, characterised in that the two rings (46, 48) are in engagement on each other.

21. A device according to claim 1, characterised in that it constitutes a unitary assembly, the two rings (16, 18) being in hooked engagement on each other by means of circumferential lugs (38) offset axially so as to engage within each other and to oppose axial separation of the rings.

22. A device according to claim 1, characterised in that it constitutes a predamper of a friction clutch for a motor vehicle.

23. A device according to one of claim 1, characterised in that it is positioned axially on a cylindrical hub (10) by means of an open ring (40, 144) or a resilient ring (150) fitted in an annular groove in the hub (10).

24. A device according to claim 22, characterised in that it is mounted inside a main damper between a guide ring (84) and an annular damper plate (82) of the said main damper, or on the outside of the main damper and substantially adjacent to a guide ring (68) of the said main damper.

25. A device according to claim 24, characterised in that friction means (146, 152) are gripped elastically between the predamper and the main damper.

* * * * *